United States Patent [19]
Farinato et al.

[11] Patent Number: 5,807,489
[45] Date of Patent: Sep. 15, 1998

[54] HIGH PERFORMANCE POLYMER FLOCCULATING AGENTS

[75] Inventors: Raymond Farinato, Norwalk; Peter Hawkins, Northford, both of Conn.

[73] Assignee: Cytec Technology Corp., Wilmington, Del.

[21] Appl. No.: 747,738

[22] Filed: Nov. 12, 1996

[51] Int. Cl.⁶ ........................................... C02F 1/54
[52] U.S. Cl. ............................................. 210/734; 210/735
[58] Field of Search .................................. 210/728, 734, 210/735, 729, 732

[56] References Cited

U.S. PATENT DOCUMENTS

| | | |
|---|---|---|
| 3,235,490 | 2/1966 | Goren . |
| 3,968,037 | 7/1976 | Morgan et al. . |
| 4,059,552 | 11/1977 | Zweigle et al. . |
| 4,172,066 | 10/1979 | Zweigle et al. . |
| 4,702,844 | 10/1987 | Flesher et al. ............................ 210/734 |
| 4,720,346 | 1/1988 | Flesher et al. . |
| 4,943,378 | 7/1990 | Flesher . |
| 4,950,725 | 8/1990 | Flesher et al. ........................... 526/307.6 |
| 4,956,399 | 9/1990 | Kozakiewicz et al. . |
| 4,956,400 | 9/1990 | Kozakiewicz et al. . |
| 5,037,881 | 8/1991 | Kozakiewicz et al. . |
| 5,152,903 | 10/1992 | Neff et al. ............................... 210/734 |
| 5,234,604 | 8/1993 | Liao et al. ............................... 210/734 |
| 5,340,865 | 8/1994 | Neff et al. ............................... 524/317 |
| 5,368,744 | 11/1994 | Wood et al. ............................. 210/734 |
| 5,405,554 | 4/1995 | Neff et al. ............................... 252/358 |
| 5,627,260 | 5/1997 | Huang et al. ............................ 210/734 |
| 5,643,461 | 7/1997 | Neff et al. ............................... 210/734 |

FOREIGN PATENT DOCUMENTS

| | | |
|---|---|---|
| 0 610 955 A2 | 8/1994 | European Pat. Off. . |
| 0 643 017 A1 | 3/1995 | European Pat. Off. . |
| 2589145 | 10/1985 | France . |
| 64-85199 | 9/1987 | Japan . |
| 1-203251 | 2/1988 | Japan . |
| 8510496 | 4/1986 | United Kingdom . |
| WO 95/14728 | 6/1995 | WIPO . |

OTHER PUBLICATIONS

J. E. Morgan, M. A. Yorke and J. E. Boothe, How Cationic Polymer Structure Relates to Dewatering Efficiency of Waste–Activated Sludges, American Chemical Society, 1980 pp. 235–252 Section 15 Ions in Polymers.

*Primary Examiner*—Jay H. Woo
*Assistant Examiner*—Betsey J. Morrison
*Attorney, Agent, or Firm*—Joseph J. Mallon; Claire M. Schultz

[57] ABSTRACT

Water-soluble, branched, high molecular weight, cationic polymer flocculants are disclosed, as well as methods of making the same and methods of dewatering suspended solids using the same.

12 Claims, No Drawings

HIGH PERFORMANCE POLYMER FLOCCULATING AGENTS

BACKGROUND OF THE INVENTION

Flocculation is a method of dewatering suspended solids by agglomerating the solids. Flocculation materially improves the dewatering rate of many types of suspended solids, including those used in mineral, papermaking, waste water treating and oil field applications.

Synthetic polymer flocculants have been utilized in the industry since the 1950's as flocculating agents in the treatment of suspended solids. However, due to modern concerns with environmental protection, sludge incineration, transportation and disposal costs, it has become increasingly desirable to improve on the performance of conventional linear polymer flocculants by providing a flocculating agent which achieves greater dewatering at a given polymer dose, or equivalent dewatering at a lower polymer dose.

The present invention provides compositions and methods for dewatering suspended solids, including those frequently encountered in the waste water treating, mining and papermaking industries, using high molecular weight, water-soluble or water-swellable, branched, cationic, polymer flocculants, as well as methods for making said compositions. The compositions and methods of the instant invention provide for superior dewatering when compared to those previously used in the art.

Linear polymer flocculants have been "structured" in the art through the use of branching or crosslinking agents. Polymer structuring is discussed by J. E. Morgan et al., Adv. Chem. Ser., Vol. 187, pp. 235–52 (1980). U.S. Pat. Nos. 4,720,346 and 4,943,378 describe the use of crosslinked cationic polymer particles having a dry particle size below 10 micrometers ($\mu$m). U.S. Pat. Nos. 5,152,903 and 5,340,865 disclose a method of flocculating using cross-linked cationic polymer microparticles. U.S. Pat. No. 3,235,490 describes a flocculation method which utilizes crosslinked polyacrylamide. U.S. Pat. No. 3,968,037 teaches a method of releasing water from activated sewage sludge using crosslinked cationic emulsion polymers. Methods and compositions useful for thickening aqueous media are given in U.S. Pat. Nos. 4,059,552; and 4,172,066. Copending applications Ser. Nos. 08/028,916, 08/028,001, 08/437,258 (abandoned), 08/454,974 (abandoned), and 08/455,419 (abandoned), which are assigned to assignee of this invention and are all hereby incorporated herein by reference, describe methods for flocculating suspended solids using cationic, high molecular weight, water-soluble, branched polymers.

Water-soluble polymers may be characterized by determining the solution viscosity of dilute e.g. 0.05% to 1%, solutions of the polymers in pure water and in salt solutions. Herein, all percentages are given as weight percent based on total weight. The dilute solution viscosity of a linear, cationic, high molecular weight water soluble polymer is typically much higher in pure water than in, for instance, 1 molar (M) NaCl solution. For our purposes, the "bulk viscosity" of a polymer is defined as the viscosity of a 0.2% solution of polymer in pure water, measured using a rotating cylinder viscometer, e.g., Brookfield viscometer, under the conditions described in the Examples. As used herein, "standard viscosity" is the viscosity of a 0.1% solution of polymer in 1M NaCl solution, also measured using a rotating cylinder viscometer, e.g., Brookfield viscometer, under the conditions described in the Examples. The ratio of the bulk viscosity to the standard viscosity, BV/SV, tends to vary as a function of the degree of structuring present in the polymer.

The "sedimentation value" also varies as a function of the degree of structuring present in the polymer. The "sedimentation value" is a sensitive indicium of the settling rate of a water-soluble or water-swellable polymer in salt solution. A sedimentation value of less than 10% means that there is little or no tendency for the polymer to sediment in salt solution. A sedimentation value is determined by preparing a 0.05% solution of a particular polymer in 0.001M NaCl, centrifuging part of the solution for about 60 minutes at about 18,000×G (gravity) and 22° C., and measuring the ultraviolet (UV) absorbance, at 215 nanometers (nm), of the uncentrifuged part and of the supernatant of the centrifuged part. The absorbance of the supernatant of the centrifuged part compared to the absorbance of the uncentrifuged part is calculated as [$\Delta$A(uncentrifuged)–$\Delta$A(centrifuged)]/$\Delta$A(uncentrifuged), where $\Delta$A=A(polymer solution)–A (water) and A is the measured UV absorbance at 215 nm. The value calculated thereby is multiplied by 100 to give the sedimentation value, which is expressed as a percentage.

Surprisingly, it has now been found that water-soluble polymers having BV/SV of from about 300 to about 500 and having sedimentation values of less than 10%, are superior flocculants for suspended solids. In particular, these polymers give faster dewatering of waste activated sludge, in particular extended aeration activated sludge, than polymers of similar molecular weight and cationicity that do not have the BV/SV and sedimentation values mentioned above.

SUMMARY OF THE INVENTION

According to the present invention, there is provided a method of dewatering extended aerated sludge, the method comprising adding to the sludge an effective amount of cationic, water soluble or water-swellable polymer to form a mixture of the sludge and the polymer, wherein the polymer has a bulk viscosity to standard viscosity ratio of from about 300 to about 500, and wherein the polymer has a sedimentation value of about 10% or less, and dewatering the mixture.

This invention provides, as a more preferred embodiment, a method of dewatering extended aerated sludge, the method comprising adding to the sludge an effective amount of water soluble copolymer of acrylamide and quaternized dialkylaminoalkyl(alk)acrylate to form a mixture of sludge and the copolymer, wherein the copolymer has at least about 20 mole percent cationic units based on the total number of moles of recurring units in said polymer, a bulk viscosity to standard viscosity ratio of from about 300 to about 500 and a sedimentation value of about 5% or less and dewatering the mixture.

This invention further provides, as a most preferred embodiment, a method of dewatering extended aerated sludge, the method comprising adding to the sludge an effective amount of water soluble copolymer of acrylamide and acryloxyethyl trimethylammonium chloride to form a mixture of sludge and the copolymer, wherein the copolymer has at least about 30 mole percent acryloxyethyl trimethylammonium chloride units based on the total number of moles of recurring units in said polymer, a bulk viscosity to standard viscosity ratio of from about 300 to about 400 and a sedimentation value of about 5% or less and dewatering the mixture.

DETAILED DESCRIPTION OF THE PREFERRED EMBODIMENTS

The high molecular weight, cationic, water-soluble or water-swellable, polymeric flocculants of the instant invention are formed by the polymerization of cationic ethylenically unsaturated monomers, alone or with comonomers, in the presence of a branching agent and a chain-transfer agent in optimum proportions. High molecular weight, cationic, water soluble or water-swellable polymers are also formed by polymerizing or copolymerizing nonionic monomers, e.g., acrylamide, to form nonionic polymers, e.g., polyacrylamide, and functionalizing nonionic polymers to impart cationic groups to the polymer, preferably tertiary aminomethyl group which may be quaternized.

Cationic monomers useful in the practice of this invention include diallyldimethylammonium chloride; acryloxyethyltrimethylammonium chloride; methacryloxyethyltrimethylammonium chloride; dialkylaminoalkyl(alk)acrylate compounds; and quaternaries and salts thereof, such as N,N-dimethylaminoethylmethacrylate methylchloride salt; monomers of N,N-dialkylaminoalkyl (meth)acrylamides; and salts and quaternaries thereof, such as N,N-dialkylaminoethylacrylamides; methacrylamidopropyltrimethylammonium chloride; 1-methacryloyl-4-methyl piperazine and the like. Quaternized dialkylaminoalkyl(alk) acrylate monomers are preferred, and acryloxyethyltrimethylammonium chloride and methacryloxyethyltrimethylammonium chloride are most preferred. Cationic monomers are generally of the following formulae:

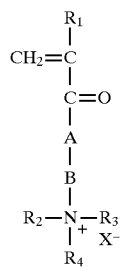

where $R_1$ is hydrogen or methyl; $R_2$ is lower alkyl of $C_1$ to $C_4$; $R_3$ is lower alkyl of $C_1$ to $C_4$; $R_4$ is hydrogen, alkyl of $C_1$ to $C_{12}$, aryl or hydroxyethyl and $R_2$ and $R_3$ or $R_2$ and $R_4$ can combine to form a cyclic ring containing one or more hetero atoms, and X is the conjugate base of an acid, A is oxygen or $-NR_1-$ wherein $R_1$ is as defined above, and B is an alkylene group of $C_1$ to $C_{12}$; or

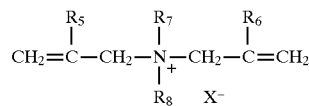

where $R_5$ and $R_6$ are hydrogen or methyl, $R_7$ is hydrogen, alkyl of $C_1$ to $C_{12}$, benzyl or hydroxyethyl; and X is defined above.

Nonionic monomers, suitable in the practice of this invention, generally comprise acrylamides; methacrylamides; and N-alkylacrylamides, such as N-methylacrylamide; and N,N-dialkylacrylamides, such as N,N-dimethylacrylamide. Acrylamide and methacrylamide are preferred. Small amounts, e.g., 10 mole % or less, based on total moles of recurring units in the polymer, of sparingly soluble nonionic monomers such as methyl acrylate, methyl methacrylate, ethyl acrylate, acrylonitrile, etc. and the like may also be suitable.

Cationic homopolymers having recurring units of one or more cationic monomers may be employed in this invention. Preferably, one or more nonionic monomers, e.g., acrylamide, may be copolymerized with one or more cationic monomers, e.g., acryloxyethyltrimethylammonium chloride to produce cationic copolymer. Preferably, cationic copolymers are comprised of at least about 20 mole % of recurring units of cationic monomer, based on the total number of moles of recurring units in the polymer. Herein, when referring to the mole % of recurring units in a polymer, all mole % are based on the total number of moles of recurring units in the copolymer. More preferably, the copolymers are comprised of at least about 25 mole % of recurring units of cationic monomer; most preferably, the copolymers are comprised of at least about 30 mole % of recurring units of cationic monomer.

Cationic charge may also be imparted to a polymer by functionalizing nonionic recurring units of the polymer. For instance, acrylamide units in the polymer backbone may be reacted with an effective amount of a formaldehyde and a secondary amine or a complex thereof in a manner known per se to form Mannich acrylamides having pendant tertiary aminomethyl groups that are cationic at low pH, or the tertiary aminomethyl groups can be quaternized to form cationic pendant groups following procedures known to those skilled in the art, e.g., see U.S. Pat. Nos. 5,037,881, 4,956,399, and 4,956,400, which are incorporated herein by reference. Formaldehydes useful in the practice of this invention are selected from formaldehyde, paraformaldehyde, trioxane, or aqueous formalin, etc. Useful secondary amines are selected from dimethylamine, methylethylamine, diethylamine, amylmethylamine, dibutylamine, dibenzylamine, piperidine, morpholine, ethanolmethylamine, diethanolamine, or mixtures thereof. Especially preferred is a process wherein the formaldehyde comprises formalin and the secondary amine comprises dimethylamine. It is also contemplated to employ a formaldehyde-secondary amine complex such as N,N-dimethylaminomethanol.

The backbone polymer which contains the nonionic groups may be comprised completely of nonionic groups, or may be comprised partly of nonionic groups and partly of cationic groups prior to the functionalization reaction that imparts the cationic groups. Preferably, a polyacrylamide emulsion or microemulsion polymer is polymerized in a known manner to form a precursor polymer, subjected to Mannich reaction conditions, and, optionally, quaternized, as in U.S. Pat. Nos. 5,037,881; 4,956,399; and 4,956,400; which are hereby incorporated herein by reference. Preferably, at least about 20 mole % of the recurring units are cationically charged. More preferably, at least about 30 mole % of the recurring units are cationically charged.

Polymerization of the monomers is generally conducted in the presence of a branching agent or crosslinking agent to form branched, or crosslinked, homopolymer or copolymer. The branching agent generally comprises compounds having either at least two double bonds, or at least a double bond and a reactive group, or at least two reactive groups. Polyfunctional branching agents should have at least some water-solubility. Preferred polyfunctional branching agents include compounds containing at least two double bonds, e.g., methylenebisacrylamide; methylenebismethacrylamide; polyethyleneglycol diacrylate; polyethyleneglycol dimethacrylate; N-vinyl acrylamide; divinylbenzene; triallylammonium salts; N-methylallylacrylamide; and the like. Also preferred are polyfunctional branching agents containing at least one double bond and at least one reactive group including glycidyl acrylate; acrolein; methylolacrylamide; and the like. Polyfunctional branching agents containing at least two reactive groups include aldehydes, such as glyoxal; diepoxy compounds and epichlorohydrin and the like. Methylenebisacrylamide ("MBA") is a preferred branching agent.

Essential to the practice of this invention is the presence of, in optimum concentration, a molecular weight modifying or chain-transfer agent to provide the proper polymer structure. In the absence of a chain-transfer agent, the incorporation of even extremely small amounts of branching agent, e.g., 10 parts per million may cause crosslinking that is so extensive as to render the polymer less effective as a flocculant. However, branched cationic polymers are obtained in accordance with the present invention when a chain-transfer agent is used, in optimum concentration, in conjunction with said branching agent. Many such chain transfer agents are well known in the art. These include lactic acid and alcohols such as isopropyl alcohol; mercaptans such as 2-mercaptoethanol; thioacids; phosphites and sulfites, such as sodium hypophosphite, although many different chain-transfer agents may be employed. Preferred chain transfer agents are isopropyl alcohol and lactic acid.

The weight average molecular weights of the polymers of the instant invention are generally greater than 500,000, preferably greater than 1,000,000. Weight average molecular weights may be determined by using light scattering methods well known to those skilled in the art.

The polymers of the instant invention are characterized by BV/SV of at least about 300, preferably at least about 320, and the BV/SV is generally no greater than about 500, preferably less than about 450, more preferably less than about 400.

It is important that optimum concentrations of chain-transfer agent and branching agent be employed in order to produce polymers having BV/SV of from about 300 to about 500, preferably about 300 to about 400, and sedimentation values of about 10% or less, preferably about 5% or less. The optimum amounts of chain-transfer agent and branching agent depend on the relative efficiencies of the particular chain-transfer agent and branching agent and will vary depending on the polymerization conditions. It is therefore, difficult to set specific amounts of chain-transfer agents and cross linking agents for all polymers and types of chain-transfer agents and cross linking agents. Routine experimental methods are particularly useful for determining optimum levels of branching agent and chain-transfer agent because the polymerization conditions will obviously affect branching and molecular weight. It is known that the usual constituents of polymerization, e.g., surfactant, polymer, monomer, solvent, etc. may act as chain transfer agents and that impurities in monomers may act as branching or crosslinking agents. Therefore, it is difficult to specify the appropriate amounts of added chain transfer agent and branching agent that will result in a polymer having a desired BV/SV and sedimentation value without knowledge of the polymerization conditions. Nevertheless, for the purpose of this invention, the general range of the concentration of chain-transfer agent may range from 0.01% to 5%, and the branching agent may range from 0.001% to 0.1%.

For a given polymer, polymerization condition, chain-transfer agent and branching agent, the optimum ratio of chain transfer agent to branching agent tends to fall in a rather narrow range. For instance, for the emulsion copolymerization of acrylamide and acryloxyethyltrimethylammonium chloride in which the branching agent MBA and the chain transfer agent lactic acid are used, the weight ratio of lactic acid to MBA should be in the range of about 40 to about 90, preferably about 50 to about 80, most preferably about 60 to about 70. The ratio tends to be much different if a more efficient chain-transfer agent, e.g., 2-mercaptoethanol were to be used. Optimum levels of chain-transfer agent and branching agent may be determined for each type of cationic polymer by routine experimental methods known to those skilled in the art. For instance, a matrix of polymerizations encompassing various combinations of different levels of chain transfer agent and branching agent could be carried out, following by determination of the BV/SV and sedimentation values of each resulting polymer.

Bulk viscosity (BV) of a polymer is determined by diluting a polymer or polymer emulsion to a concentration of 0.2% in pure water, stirring to dissolve the polymer, and measuring the viscosity using a rotating cylinder viscometer, specifically a Brookfield LVT viscometer, with a #2 spindle at 30 revolutions per minute (rpm). Standard viscosity of a polymer is determined by dissolving a polymer or polymer emulsion in deionized water, then adding NaCl solution to give a polymer concentration of 0.1% and a NaCl concentration of 1.0M, and measuring the viscosity of the polymer solution by using a rotating cylinder viscometer, specifically a Brookfield LVT viscometer, with a #00 spindle at 60 revolutions per minute (rpm). In the case of long dissolution times, the pH may need to be adjusted to be in the range of about 3 to about 4 to stabilize the polymer.

A sedimentation value is determined by first isolating a polymer sample by precipitating the polymer emulsion or polymer solution into an organic solvent e.g., acetone, to remove ultraviolet (UV) absorbing substances e.g. surfactants, then collecting and drying the polymer. A solution of the polymer is then prepared by stirring the isolated polymer in deionized water until it dissolves and adding NaCl solution to give a polymer solution having a polymer concentration of 0.05% and a NaCl concentration of 0.001M. Part of the polymer solution is then centrifuged for about 60 minutes at about 18,000×G (gravity) and 22° C., and the UV absorbance, at 215 nanometers (nm), of the uncentrifuged part and of the supernatant of the centrifuged part are measured. The sedimentation value is equal to $\Delta\Delta A/\Delta A$, which is equal to $[\Delta A(\text{uncentrifuged}) - \Delta A(\text{centrifuged})]/\Delta A(\text{uncentrifuged})$, where $\Delta A = A(\text{polymer solution}) - A(\text{water})$ and A is the measured UV absorbance at 215 nm. A convenient centrifuge is a Labnet ZK380 centrifuge with a fixed angle rotor spinning at 13,000 rpm and a constant temperature of 22° C. The UV absorbance measurements may be performed using a flow-through UV detector (ABI model 875A), drawing the solutions through the detector using a Harvard syringe pump in a withdraw mode at about 0.5 milliliters per minute. Other types of equipment substantially equivalent to that used herein are well known to those skilled in the art.

Polymerization may be carried out using microemulsion or emulsion polymerization techniques. These techniques are widely known to those skilled in the art. For instance, emulsion polymerization procedures generally involve the preparation of two phases as described in U.S. Pat. No. 3,284,393, which is incorporated herein by reference. The aqueous phase is comprised of the monomer(s), branching agent and chain-transfer agent dissolved in deionized water, and other additives well known to those skilled in the art, such as stabilizers and pH adjusters. The oil phase usually comprises a water-insoluble hydrocarbon solution of surfactant(s). The aqueous phase and oil phase are mixed and homogenized in a conventional apparatus to form an emulsion, sparged with inert gas or otherwise deoxygenated, then polymerization initiated in the usual manner. Polymerization may also be carried out by using microemulsion techniques well known in the art as in U.S. Pat. Nos. 5,037,881; 4,956,399; 4,956,400; and 4,521,317 which are hereby incorporated herein by reference.

Polymerization may also be carried out by solution polymerization techniques. The monomer(s), branching agent, and chain-transfer agent are added to water, deoxygenated as above, and polymerized by any conventional initiator. Viscous solutions of structured polymers, useful in the present invention, are produced when the amounts and types of branching agent and chain transfer agent are selected, via routine experimentation, to produce polymer with BWSV of from about 300 to about 500 and sedimentation value of about 10% or less.

Any conventional additives may be used for stabilization purposes. Suitable additives include ammonium sulfate, ethylene diaminetetraacetic acid (disodium salt) and diethylene triaminepentaacetate (pentasodium salt). See Modern Plastics Encyclopedia/88, McGraw Hill, October 1987, pp. 147–8.

Any conventional initiator may be employed to initiate polymerization, including thermal, redox and ultraviolet radiation. Suitable for use in this invention are azobisisobutyronitrile; sodium sulfite; sodium metabisulfite; 2,2'-azobis (2-methyl-2-amidinopropane) dihydrochloride; ammonium persulfate and ferrous ammonium sulfate hexahydrate, and the like. Organic peroxides may also be employed for polymerizing ethylenically unsaturated monomers. A particularly preferred initiator for the purpose of this invention is sulfur dioxide/sodium bromate. See Modern Plastics Encyclopedia/88, McGraw Hill, October 1987, pp. 165–168.

The product so prepared is a cationic, high molecular weight, polymer that is generally soluble in pure water. In waters commonly encountered in application, e.g. hard waters or waters containing various amounts of minerals, the polymer may be water-swellable. The polymers of the instant invention are particularly useful as chemical flocculating agents.

The flocculation and dewatering stages of this invention, to release water from a dispersion of suspended solids, are carried out by adding the cationic, branched, high molecular weight, water-soluble or water-swellable, polymeric flocculant, either in solution or directly as an emulsion or microemulsion, to the suspended solids, mixing the suspended solids and polymer to flocculate the solids, and then dewatering, preferably using a conventional dewatering apparatus e.g. centrifuge, belt press, piston press, filter, etc. to remove water from the suspension. The products of this invention are useful in facilitating a wide range of solids/liquids separations, including industrial sludges, dewatering suspended solid in wastewater treating applications, for the drainage of cellulosic suspensions such as those found in paper production, and for the settlement of various inorganic suspensions.

The optimum dose of the polymer is determined by routine experimentation, well known to those skilled in the art. Cationic, water-soluble or water-swellable, branched polymers of the instant invention, having BV/SV of from about 300 to about 500 and having a sedimentation value of less than 10%, perform substantially better than polymers that do not have these BV/SV and sedimentation values. For instance, FIG. 1 shows the results of laboratory testing on suspended solids in the form of waste activated sewage sludge. In this test, the dewatering rate of the sludge after being flocculated with polymer flocculants A through G is shown as a function of polymer dose. The BV/SV values of the flocculants are shown in Table 1. Note that sludges flocculated with polymers B, C, and G, which have BV/SV greater than 300, dewatered significantly faster than the sludges treated with polymers A, D, E and F. The sludge treated with polymer C dewatered at a rate substantially similar to the sludges treated with polymers G and B, but a much higher dose of polymer was required. The sedimentation values of polymers B, C and G are shown in Table 2. Note that polymer C has a sedimentation value greater than 10%. Thus, the polymers which gave the highest rates of dewatering, namely polymers B, C and G, all had BWSV values that were in the range of 300 to 500. Polymers B and G, which dewatered at a dose significantly lower than C, also had sedimentation values below 10%. These results show that polymers having BV/SV in the range of about 300 to about 500, and having sedimentation values of 10% or less performed significantly better than polymers which did not have these BV/SV and sedimentation attributes.

This invention is particularly suitable for dewatering sludge, particularly sludge comprising biologically treated suspensions. Generally, sludge is any thick, viscous mass, usually a sediment or filtered waste product. Waste activated sludge refers to sludge which has undergone aerobic, suspended growth and biological treatment using the metabolic reactions of microorganisms to produce a high quality effluent by converting and removing substances having a high oxygen demand. This process for producing waste activated sludge reduces the concentration of dissolved, particulate and colloidal organic pollutants in the wastewater. Additionally, this process also reduces the ammonia concentration in the wastewater (nitrification). Ammonia is an inorganic pollutant toxic to aquatic life at high concentrations and exerts an oxygen demand on the receiving water.

Extended aeration is a waste activated sludge process that retains the waste water in the aeration tank for 18 hours or more and operates in a medium which deprives the microorganisms of enough food to support all of them. The microorganisms therefore compete actively for the limited food supply and even use their own cell mass for food. This highly competitive situation results in a highly treated effluent with low sludge production. See Operation of Municipal Wastewater Treatment Plants, Manual of Practice, MOP 11, Vol 11, 1990, pp. 418–419 and 501–516, which is hereby incorporated herein by reference. As used herein, extended aerated sludge refers to waste activated sludge that has been subjected to the conditions for extended aeration. Alternatively, for the purposes of this invention, extended aerated sludge refers to sludge that has similar chemical and/or physical characteristics typically associated with extended aerated activated sludge.

An aspect of the instant invention relates to a method of dewatering sludge. More preferably, this invention relates to a method of dewatering waste activated sludge. Most preferably, this invention is directed to a method of dewatering extended aerated sludge.

The following Examples illustrate the present invention. They are not to be construed to limit the claims in any manner whatsoever.

Polymers A, C, D, E, and F are believed to be copolymers of acrylamide and cationic monomers and are all available commercially. Polymer A is SD-2081™, available commercially from Cytec Industries, Inc. Polymer C is EM840TPD™, available commercially from SNF Floerger. Polymer D is Percol 778FS25™, Polymer E is Percol 778FS40™, and Polymer F is Percol 775FS25™; all are available commercially from Allied Colloids, Inc.

EXAMPLE 1

Preparation of polymer G: An aqueous phase was prepared by mixing together the following: 210 parts 50% aqueous acrylamide, 238.74 parts 80% acryloxyethyltrimethylammonium chloride, 120 parts deionized water, 17.76 parts citric acid, 0.74 parts 40% diethylenetriaminepentaacetic acid, pentasodium salt (chelating agent), 0.67 parts 89% lactic acid (chain-transfer agent), 0.0089 parts methylenebisacrylamide (branching agent), and 0.015 parts sodium bromate. The pH was adjusted to about 3.5 using 2.3 parts 29% aqueous ammonia, then deionized water was added to give a total of 612 parts.

An oil phase was prepared by adding 11.13 parts of sorbitan monooleate and 10.29 parts of a nonionic surfactant made of ethoxylated linear alcohols, HLB=12.0, to 148.58 parts of a paraffinic solvent (mixture of branched and cyclic hydrocarbons, boiling point range of 408 to 442 F.) in a mixing vessel. The aqueous phase was added to the oil phase with mixing; the crude emulsion was then mechanically homogenized to give a monomer emulsion. The monomer emulsion was transferred to suitable reaction vessel equipped with stirring means, gas dip tube, vent line and thermometer; the mixing vessel was rinsed with 10 parts of paraffinic solvent, which was also added to the emulsion. The mixture was sparged with nitrogen for 30 minutes.

The polymerization was initiated at 24° C. using sulfur dioxide gas (4000 ppm in nitrogen); the flow rate was controlled such that the mixture exothermed to 40° C. over a 35 minute period; a temperature of 40°–42° C. was then maintained by active cooling of the reaction vessel, as the sulfur dioxide flow rate was gradually increased over a 20 minute period. After the exotherm had completed, the temperature was maintained at 40°–42° C. for 3.5 hours by heating. After the polymerization was complete, the nitrogen and sulfur dioxide were turned off. About 8.0 parts of a nonionic surfactant made of ethoxylated linear alcohols, HLB=12.0, was added over a 15 minute period; the emulsion was allowed to mix for 1.5 hours and cool to ambient temperature.

EXAMPLE 2

Preparation of polymer B: An aqueous phase was prepared by mixing together the following: 13413 parts 52.5% aqueous acrylamide, 13200 parts 80% acryloxyethyltrimethylammonium chloride, 7643 parts deionized water, 151 parts 17% sulfuric acid, 18 parts 40% ethylenediaminetetraacetic acid, disodium salt, 650 parts isopropanol (chain-transfer agent), 0.44 parts methylenebisacrylamide, and 1 part 70% t-butylhydroperoxide.

An oil phase was prepared by adding 572 parts of a surfactant containing predominately dihydroxyethyl oleamide and 308 parts of polyoxyethylene monooleate, HLB= 11.4, to 12814 parts of a paraffinic solvent (mixture of branched and cyclic hydrocarbons, boiling point range of 408°–442° F.) in a mixing vessel. The aqueous phase was added to the oil phase with mixing; the crude emulsion was homogenized to give a monomer emulsion. The monomer emulsion was transferred to suitable reaction vessel equipped with stirring means, gas dip tube, vent line and thermometer. The mixture was sparged with nitrogen for 30 minutes.

The polymerization was initiated at 24° C. using sulfur dioxide gas (4000 ppm in nitrogen); the flow rate was controlled such that the mixture exothermed to 40° C. over a 35 minute period; a temperature of 40° to 42° C. was then maintained by active cooling of the reaction vessel, as the sulfur dioxide flow rate was gradually increased over a 20 minute period. After the exotherm had completed, the temperature was maintained at 40° to 42° C. for 3.5 hours by heating. After the polymerization was complete, the nitrogen and sulfur dioxide were turned off. About 940 parts of polyoxyethylene monooleate, HLB=11.4 were added over a 15 minute period; the emulsion was allowed to mix for 1.5 hours and cool to ambient temperature.

EXAMPLES 3–16

Bulk viscosities (BV) of Polymers A through G were determined as follows: Polymer or polymer emulsion was diluted in deionized water and stirred until the polymer dissolved, so that the polymer concentration was 0.2%. The bulk viscosity (BV) was determined at 25° C.±1° C. using a Brookfield viscometer (LVT model) with a #2 spindle at 30 rpm.

Standard viscosities (SV) of Polymers A through G were determined as follows: Polymer or polymer emulsion was diluted in deionized water and stirred until the polymer dissolved, then NaCl solution added so that the polymer concentration was 0.1% and the NaCl concentration was 1.0M. The standard viscosity (SV) was determined at 25° C.±1° C. using a Brookfield viscometer (LVT model) with a #00 spindle at 60 rpm. The BV, SV and BV/SV of Polymers A–G are shown in Table 1. In the case of long dissolution times, e.g overnight, the pH was adjusted to be in the range of about 3 to about 4 to stabilize the polymer.

TABLE 1

| Polymer | BV, centipoise | SV, centipoise | BV/SV |
|---------|----------------|----------------|-------|
| A*      | 453            | 3.32           | 136   |
| B       | 708            | 2.09           | 339   |
| C*      | 585            | 1.53           | 382   |
| D*      | 284            | 2.37           | 120   |
| E*      | 411            | 2.29           | 179   |
| F*      | 397            | 2.42           | 164   |
| G       | 705            | 1.94           | 363   |

*Comparative Examples

EXAMPLES 17–19

The sedimentation values of Polymers B, C, and G were determined as follows: Hydrocarbon oil was added to the polymer emulsions to reduce the viscosity of the emulsion, and the emulsions were added dropwise, with stirring, to an excess of acetone to precipitate the polymer. The polymer was collected and dried. A polymer solution was prepared by stirring the dried polymer in deionized water until it dissolved, then adding NaCl solution to give a polymer solution having a polymer concentration of 0.05% and a NaCl concentration of 0.001M. In the case of long dissolution times, e.g overnight, the pH was adjusted to be in the range of about 3 to about 4 to stabilize the polymer. Part of the solution was centrifuged for about 60 minutes at about 18,000×G and 22° C. The ultraviolet (UV) absorbance, at 215 nanometers (nm), of the uncentrifuged part and of the supernatant of the centrifuged part were determined. The sedimentation value is equal to $\Delta\Delta A/\Delta A$, which is equal to $[\Delta A(\text{uncentrifuged})-\Delta A(\text{centrifuged})]/\Delta A(\text{uncentrifuged})$, where $\Delta A=A(\text{polymer solution})-A(\text{water})$ and A is the absorbance value measured by UV absorbance at 215 nm. A Labnet ZK380 centrifuge with a fixed angle rotor was used, spinning at 13,000 rpm and at a constant temperature of 22° C. The UV absorbance measurements were performed using a flow-through UV detector (ABI model 875A), drawing the solutions through the detector using a Harvard syringe pump in a withdraw mode at about 0.5 milliliters per minute. The sedimentation values of Polymers B, C and G are shown in Table 2.

TABLE 2

| Polymer | Sedimentation Value |
|---------|---------------------|
| B       | 0                   |
| C*      | 23                  |
| G       | 3                   |

*Comparative Examples

EXAMPLES 20–26

Solutions of Polymers A through G were prepared at polymer concentration of 0.2%. Various amounts of polymer solutions were mixed with 200 gram samples of suspended solids (waste activated sewage sludge, about 1.2% solids) to achieve a range of polymer "doses." The polymer/sludge mixtures were stirred vigorously and filtered through a funnel fitted with a 35 mesh stainless steel screen. The volume in milliliters (mL) of water draining through the screen during the first ten seconds of filtration was recorded as the drainage volume. The dose and drainage volume for each polymer are given in Table 3. The drainage volume of each sample of each polymer is plotted in FIG. 1 as a function of the polymer dose, where the dose is in units of pounds of polymer per dry ton of sludge solids. A high drainage volume means that the sludge dewatered rapidly. FIG. 1 shows that Polymers B and G both flocculated the suspended sewage sludge solids more efficiently than the other polymers, giving higher dewatering rates than Polymers A, D, E, and F, and giving substantially equivalent performance to Polymer C, but at much lower polymer doses than Polymer C.

TABLE 3

| Polymer | Dose (pounds/dry ton) | Drainage Volume (mL) |
|---------|-----------------------|----------------------|
| A*      | 3.4                   | 89                   |
|         | 6.7                   | 109                  |
|         | 10.1                  | 107                  |
|         | 13.4                  | 112                  |
|         | 16.8                  | 108                  |
| B       | 10.1                  | 125                  |
|         | 13.4                  | 154                  |
|         | 16.8                  | 154                  |
|         | 20.2                  | 165                  |
| C*      | 13.4                  | 117                  |
|         | 16.8                  | 160                  |
|         | 20.2                  | 166                  |
|         | 23.5                  | 168                  |
|         | 26.9                  | 166                  |
| D*      | 6.7                   | 114                  |
|         | 10.1                  | 122                  |
|         | 13.4                  | 127                  |
|         | 16.8                  | 133                  |
|         | 23.5                  | 132                  |
| E*      | 6.7                   | 101                  |
|         | 10.1                  | 114                  |
|         | 13.4                  | 119                  |
|         | 16.8                  | 124                  |
|         | 26.9                  | 109                  |
| F*      | 3.4                   | 82                   |
|         | 6.7                   | 124                  |
|         | 10.1                  | 128                  |
|         | 16.8                  | 120                  |
| G       | 6.7                   | 87                   |
|         | 10.1                  | 140                  |
|         | 13.4                  | 161                  |
|         | 16.8                  | 165                  |

*Comparative Examples

EXAMPLES 27–33

Solutions of Polymers A through G were prepared at polymer concentration of 0.2%. Various amounts of polymer solutions were mixed with 200 gram samples of suspended solids (extended aerated sewage sludge) to achieve a range of polymer "doses." The polymer/sludge mixtures were stirred vigorously and filtered through a funnel fitted with a 35 mesh stainless steel screen. The volume in milliliters (mL) of water draining through the screen during the first ten seconds of filtration was recorded as the drainage volume. Polymers B and G both flocculated the suspended extended aerated sewage sludge solids more efficiently than the other polymers, giving higher dewatering rates than Polymers A, D, E, and F, and giving substantially equivalent performance to Polymer C, but at much lower polymer doses than Polymer C.

What is claimed is:

1. A method of dewatering waste activated sludge, the method comprising
    A. adding to the sludge at least 10.1 lbs./DT of cationic, water soluble or water-swellable polymer to form a mixture of the sludge and the polymer, wherein the polymer has been made using amounts of branching agent and chain transfer agent effective to provide said polymer with a bulk viscosity to standard viscosity ratio of from about 300 to about 500, and a sedimentation value of about 10% or less, and
    B. dewatering the mixture.

2. The method of claim 1 wherein the polymer contains at least about 20 mole percent cationic units based on the total number of moles of recurring units in said polymer.

3. The method of claim 1 wherein the polymer contains recurring quaternized dialkylaminoalkyl(alk)acrylate units.

4. The method of claim 3 wherein the polymer contains at least about 20 mole percent quaternized dialkylaminoalkyl(alk)acrylate units based on the total number of moles of recurring units in said polymer.

5. The method of claim 1 wherein the polymer has an average molecular weight of at least about 1,000,000.

6. The method of claim 1 wherein the sludge comprises extended aerated sludge.

7. The method of claim 1 wherein the dewatering is performed on a centrifuge, belt press or piston press.

8. A method of dewatering waste activated sludge, the method comprising
    A. adding to the sludge at least 10.1 lbs./DT of water soluble copolymer having recurring units selected from the group consisting of acrylamide, quaternized dialkylaminoalkyl(alk)acrylate and quaternized tertiary aminomethyl, to form a mixture of sludge and the copolymer, wherein the copolymer has at least about 20 mole percent cationic units based on the total number of moles of recurring units in the polymer, and wherein the copolymer has been made using amounts of branching agent and chain transfer agent effective to provide said polymer with a bulk viscosity to standard viscosity ratio of from about 300 to about 500 and a sedimentation value of about 5% or less, and
    B. dewatering the mixture.

9. A method of dewatering waste activated sludge, the method comprising
    A. adding to the sludge at least 10.1 lbs./DT of water soluble copolymer of acrylamide and acryloxyethyltrimethylammonium chloride to form a mixture of sludge and the copolymer, wherein the copolymer has at least about 30 mole percent acryloxyethyltrimethylammonium chloride units based on the total number of moles of recurring units in said polymer, and wherein the copolymer has been made using amounts of branching agent and chain transfer agent effective to provide said polymer with a bulk viscosity to standard viscosity ratio of from about 300 to about 400 and a sedimentation value of about 5% or less, and
    B. dewatering the mixture.

10. A method of dewatering a suspension of inorganic solids, the method comprising
    A. adding to said suspension at least 10.1 lbs./DT of cationic, water soluble or water-swellable polymer to form a mixture of the inorganic solids and the polymer, wherein the polymer has been made using amounts of branching agent and chain transfer agent effective to provide said polymer with a bulk viscosity to standard viscosity ratio of from about 300 to about 500, and a sedimentation value of about 10% or less, and
    B. dewatering the mixture.

11. The method of claim 10 wherein the polymer contains at least about 20 mole percent cationic units based on the total moles of recurring units in said polymer.

12. The method of claim 10 wherein the polymer contains recurring quaternized dialkylaminoalkyl(alk)acrylate units.

* * * * *

UNITED STATES PATENT AND TRADEMARK OFFICE
CERTIFICATE OF CORRECTION

PATENT : 5,807,489

DATED : Sep. 15, 1998

INVENTOR(S) : Farinato et al.

It is certified that error appears in the above-identified patent and that said Letters Patent is hereby corrected as shown below:

On the title page, insert the following item:
--[60] Provisional Application Ser. No. 60/006,716, filed Nov. 14, 1995--.

Column 1, line 3, insert the following:
--CROSS REFERENCE TO RELATED APPLICATION
Reference is made to and priority claimed from U.S. Provisional Application Ser. No. 60/006,716, filed Nov. 14, 1995, entitled High Performance Polymer Flocculating Agents--.

Signed and Sealed this

Seventh Day of December, 1999

Attest:

Q. TODD DICKINSON

*Attesting Officer*    *Acting Commissioner of Patents and Trademarks*